United States Patent
Pailles

(10) Patent No.: US 7,565,321 B2
(45) Date of Patent: Jul. 21, 2009

(54) TELEPAYMENT METHOD AND SYSTEM

(75) Inventor: Jean-Claude Pailles, Epron (FR)

(73) Assignee: France Telcom, Paris (FR)

( * ) Notice: Subject to any disclaimer, the term of this patent is extended or adjusted under 35 U.S.C. 154(b) by 734 days.

(21) Appl. No.: 10/467,711

(22) PCT Filed: Jan. 16, 2002

(86) PCT No.: PCT/FR02/00153

§ 371 (c)(1),
(2), (4) Date: Dec. 8, 2003

(87) PCT Pub. No.: WO02/065414

PCT Pub. Date: Aug. 22, 2002

(65) Prior Publication Data

US 2004/0083166 A1 Apr. 29, 2004

(30) Foreign Application Priority Data

Feb. 12, 2001 (FR) .................................. 01 01900

(51) Int. Cl.
*G06Q 40/00* (2006.01)
(52) U.S. Cl. ............................. 705/40; 705/35; 705/37; 705/38; 705/36
(58) Field of Classification Search ........................ None
See application file for complete search history.

(56) References Cited

U.S. PATENT DOCUMENTS

| | | | | |
|---|---|---|---|---|
| 5,204,902 A | * | 4/1993 | Reeds et al. | 380/248 |
| 5,608,778 A | * | 3/1997 | Partridge, III | 455/411 |
| 6,098,053 A | * | 8/2000 | Slater | 705/44 |
| 6,868,391 B1 | * | 3/2005 | Hultgren | 705/26 |
| 6,915,272 B1 | * | 7/2005 | Zilliacus et al. | 705/26 |
| 2001/0016835 A1 | * | 8/2001 | Hansmann et al. | 705/40 |

(Continued)

FOREIGN PATENT DOCUMENTS

DE 198 43 439 A 3/2000

(Continued)

OTHER PUBLICATIONS

"Second quarter sales surge but competition depresses margins" Personal Computer Market Europe, Mideast and Africa:; [London edition] Taylor, Paul. Financial Times. London (UK): Jul. 28, 1998. p. 04.*

*Primary Examiner*—Harish T. Dass
*Assistant Examiner*—Benjamin S Fields
(74) *Attorney, Agent, or Firm*—Cohen Pontani Lieberman & Pavane LLP

(57) ABSTRACT

After a preliminary exchange between the vendor and the purchaser with a view to completing a transaction corresponding to the payment of an amount due to the vendor for a service rendered, information is exchanged only between the purchaser and a telepayment server (T). The purchaser sends the telepayment server information (1) including data relating to the vendor and said amount. The server then authenticates the vendor's identifier (I1) on the basis of the information received and responds by sending the purchaser a message (2) instructing payment of said amount and including at least said amount and the identifier (I1) of the vendor. The purchaser responds by sending the server confidential information (3) enabling payment of said amount, after verification by the purchaser of the identifier (I1) of the vendor.

11 Claims, 1 Drawing Sheet

U.S. PATENT DOCUMENTS

2001/0027422 A1* 10/2001 Brandrud .................... 705/26
2004/0015403 A1* 1/2004 Moskowitz et al. .......... 705/26

FOREIGN PATENT DOCUMENTS

| EP | 0 708 547 A | 4/1996 |
|---|---|---|
| FR | 2 790 162 | 8/2000 |
| WO | WO 9411849 A1 * | 5/1994 |
| WO | WO 96 13814 A | 5/1996 |
| WO | WO 9837524 A1 * | 8/1998 |
| WO | WO 98 47116 A | 10/1998 |

* cited by examiner

TELEPAYMENT METHOD AND SYSTEM

This is a U.S. national stage of application No. PCT//FR02/00153, filed on 16 Jan. 2002.

FIELD OF THE INVENTION

The present invention relates to a telepayment method and system.

To be more specific, the invention relates to a telepayment method involving a first entity called "the vendor" having a first identifier and telecommunications equipment, a second entity called "the purchaser" having a second identifier and mobile equipment of the GSM type, and a third entity called "the telepayment server" with which the purchaser and the vendor have entered into an agreement and which is able to set up a connection at least with said mobile equipment, which method includes a preliminary exchange between the vendor and the purchaser with a view to completing a transaction corresponding to the payment of an amount due to the vendor for a service.

BACKGROUND OF THE INVENTION

In a method of the above kind described in the document FR 2 790 162, for example, the vendor's telecommunications equipment is a Minitel (registered trade mark) terminal or a personal computer (PC) connected to the Internet.

That method is undoubtedly advantageous from the point of view of purchase confidentiality.

However, it has the drawback of requiring information to be exchanged between, firstly, the purchaser and the server and, secondly, the vendor and the server, which complicates the telepayment method and furthermore has the effect of slowing down the processing of the information exchanged.

Furthermore, the above method has the disadvantage of obliging the purchaser to authenticate himself to the telepayment server by means of his microchip bank card number.

Attempts are currently underway to alleviate such lack of an instant response in exchanges between a purchaser and a vendor by providing an electronic purse system, whereby money is exchanged between a purchaser's microchip bank card and a vendor's microchip bank card. It goes without saying that the exchange must be totally secure, to prevent any possibility of fraudulent attempts to create counterfeit money. Thus, like the method described in the document FR 2 790 162 mentioned above, a method of the above kind has the disadvantage of having to use electronic signature principles that are complex to put into practice and are based on a fundamental assumption as to the integrity of electronic money storage in the microchip cards, the validity of which assumption is far from self-evident.

What is more, an electronic purse system of the above kind necessitates:
  either the use of a single terminal provided with a microchip card reader and having two slots to receive the purchaser's microchip bank card and the vendor's microchip bank card, the exchange of money in this case being possible only if the purchaser and the vendor are together, which is not always possible or desirable,
  or, in the case of a remote exchange of money via a network, the use of a first terminal belonging to the purchaser and having a microchip bank card reader and a second terminal belonging to the vendor and having a microchip bank card reader, the two readers necessarily being connected together.

It must be noted that the above features are found to be not only relatively inflexible but also costly, because a card reader is used in both cases.

SUMMARY OF THE INVENTION

A particular object of the present invention is to remedy these drawbacks.

To this end, the telepayment method of the invention comprises, after said preliminary exchange, only exchanges of information between the purchaser and the telepayment server, during which exchanges:

a) the purchaser sends the telepayment server non-confidential information including data relating to the vendor and said amount for the service, b) the server authenticates the vendor's identifier on the basis of the information received and responds by sending the purchaser a message requesting the purchaser to enter a payment code, said message including at least said amount and the identifier of the vendor.

A telepayment method of the above kind proves to be less complex and less costly than the prior art telepayment methods referred to above since the vendor no longer has to communicate with the server and the number of the purchaser's microchip bank card is no longer communicated.

Preferred embodiments of the method of the invention have one or more of the following features:
  the purchaser verifies the vendor's identifier either before step a) or after step b) and, during a step c), if the result of such verification is positive, the purchaser sends the server confidential information enabling payment of said amount;
  the vendor's telecommunications equipment is a GSM mobile telephone, with the result that the telepayment method is easy to use given the now widespread use of this type of telephone and the secure nature of the method of identifying the user by having the mobile network authenticate the Subscriber Identification Module (SIM) card;
  the purchaser's mobile telephone is of the same generation as the vendor's mobile telephone;
  the purchaser's mobile telephone is of a different generation to the vendor's mobile telephone, which ensures great flexibility;
  the respective mobile telephone numbers of the purchaser and of the vendor, and the first identifier and the second identifier are supplied to the telepayment server when the agreement is first entered into;
  the information sent to the server in step a) and in step c) takes the form of a numerical message, enabling the purchaser to avoid having to enter letters on the keypad of his telephone, which is irksome;
  step c) is followed by a step d) during which the telepayment server verifies the information received and, if the result of said verification is positive, sends the purchaser and the vendor respective confirmation messages that said amount has been paid;
  on receiving his confirmation message, the vendor authenticates the payments server by means of a secret code supplied by the vendor to the telepayment server when the agreement is first entered into;
  the data of the numerical message sent in step a) is the vendor's mobile telephone number; and
  the numerical message sent in step c) is a secret payment code supplied by the purchaser to the server when the agreement is first entered into.

In the system for implementing the above telepayment method, only the mobile equipment exchanges information with the telepayment server and:

a) said mobile equipment is adapted to send the telepayment server information including data relating to the vendor and said amount for the service, b) the server includes means for authenticating the vendor's identifier on the basis of the information received and means for sending in response to the purchaser a message instructing the purchaser to enter a payment code, said message including at least said amount and the vendor's identifier, and c) said second equipment further includes means for verifying the identity of the vendor from the information received and means for sending the server in response confidential information enabling payment of said amount if the result of the verification is positive.

BRIEF DESCRIPTION OF THE DRAWINGS

Other features and advantages of the invention become apparent from the following description of an embodiment of the invention, which is given by way of non-limiting example and with reference to the single FIGURE of the accompanying drawing.

That FIGURE shows the general architecture of a telepayment system of the invention and the connections set up between the various entities of the system.

DETAILED DESCRIPTION OF THE DRAWINGS

Figure 1:
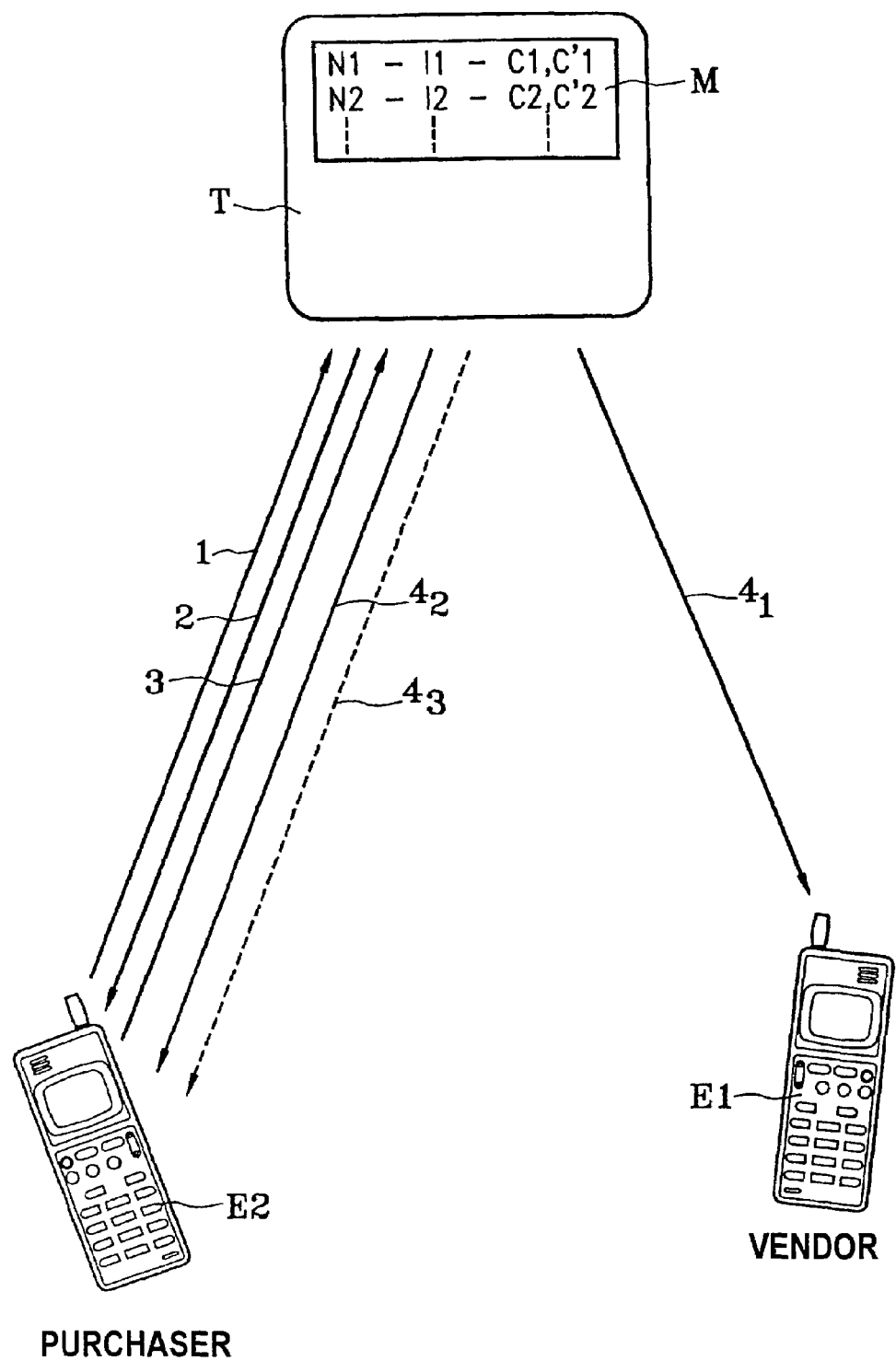

Referring to accompanying FIG. 1, there is shown first telecommunications equipment E1 belonging to a vendor V, advantageously a GSM mobile telephone, and a GSM mobile telephone E2 belonging to a purchaser.

Also shown is a telepayment server T with which the purchaser and the vendor have previously entered into an agreement and which logs a payment and updates the respective accounts of the purchaser and the vendor. When first entering into the agreement, the vendor supplies the server T with an identifier I1, for example his name or pseudonym, and his international mobile subscriber number N1. Similarly, the purchaser supplies the server T with an identifier I2 and his international mobile subscriber number N2. Finally, the telepayment server T supplies its telephone number N3 to the purchaser and to the vendor.

Because of the difficulties associated with voice synthesis of names, when they first enter into their agreement the vendor and the purchaser enter or have entered for them their respective alphabetical identifiers I1, I2 and themselves record their spoken identifier. To this end, the server T includes a memory M which stores each subscriber number N1 and N2 and each identifier I1 and I2 corresponding thereto, both in alphabetical form and in vocal form, so that the server T can send the purchaser or the vendor voice or alphabetic messages according to the types of mobile telephone used by the purchaser and the vendor.

What is more, at the time of first entering into the agreement, the purchaser provides two numerical codes C2 and C'2 in addition to his identifier I2 and his subscriber number N2. The code C2 is a secret payment code and the code C'2 is a secret code that the server T sends the purchaser when the latter has paid. Likewise the vendor, who can very well also be a purchaser, supplies numeric code C'1 in addition to his identifier I1 and his subscriber number N1. The code C'1 is a secret code that the server T sends the vendor, when making a purchase, when the vendor has paid.

The telepayment operation with which the invention is more particularly concerned is preceded by a preliminary exchange or negotiation between the vendor and the purchaser. The negotiation can be conducted remotely (by telephone, via the Internet, etc.) or by means of a spoken exchange between the purchaser and the vendor. The negotiation ends with the purchaser agreeing to pay an amount MT for a service to be provided by the vendor. During the negotiation, the vendor must give the purchaser his mobile telephone number N1 and his identifier I1.

Three variants of a telepayment method according to the invention are described in detail next, corresponding to three generations of mobile telephone used by the purchaser. It will become more explicitly apparent in the remainder of the description that the generation of the vendor's mobile telephone is relatively unimportant, since his mobile telephone E1 functions only as a receiver during the telepayment process.

1. Variant in Which the Purchaser Uses a First Generation (Phase 1 or Phase 2) Mobile Telephone E2

This kind of mobile telephone has the standard functions of a fixed telephone (dialing to make a call, being called, voice communications) and the following functions for sending or receiving data:

sending dual tone multifrequency (DTMF) coded data during voice calls, corresponding to the codes of keys that the user presses on the keypad of his telephone, and sending and receiving Short Message Service (SMS) messages, which can be stored in a Subscriber Identification Module (SIM) card.

In this case, the telepayment process is as follows:

The purchaser enters on the keypad of his mobile telephone E2 the telephone number N3 of the telepayment server T. The telepayment server T then sends a voice message such as "Enter the mobile telephone number N1 of the vendor I1, press the hash key, and enter the amount MT".

During a next step a), the purchaser sends the telepayment server T an entirely numerical information message 1 which contains only the vendor's mobile telephone number N1 and the amount MT.

During a next step b), after receiving the message 1, the telepayment server T extracts from its memory M the vendor's identifier I1 associated with the mobile telephone number N1 and sends the purchaser a voice message 2 such as "To pay the amount MT to the vendor I1, enter your payment code".

Reception of the message 2 has the advantage that the purchaser can tell, right at the start of the process, if he made a mistake when he entered the vendor's mobile telephone number, which provides a simple and reliable way to avoid paying the amount MT to a vendor having an identifier other than the identifier I1.

During a step c), the purchaser sends the telepayment server T an entirely numerical information message 3 that contains only the secret payment code C2 supplied by the purchaser to the server T when first entering into the agreement, the purchaser entering this code on the keypad of his mobile telephone E2.

After authenticating the purchaser by means of his payment code C2, the telepayment server T checks the purchaser's bank account. This check can be envisaged in various ways. Conventionally, the telepayment server T can include dedicated connection means to the purchaser's bank, and in this case requests authorization from the bank to debit the purchaser's account. The telepayment server T can instead itself contain the purchaser's bank account in a dedicated memory, which has the advantage of eliminating the server-bank connection and thereby accelerating the telepayment process.

Furthermore, the server T includes a currency converter module (not shown) if the currency used by the purchaser is different from that of the vendor, for example.

Finally, during a step d), the telepayment server T:
sends the vendor an SMS message $4_1$ such as "You have received the amount MT from the purchaser I2", and
sends the purchaser a voice message $4_2$ such as "Thanks, bye for now", which indicates to the purchaser that the amount MT has been paid.

In a manner that is particularly advantageous, the voice message $4_1$ contains the secret code C'1 supplied by the vendor when he first enters into the agreement with the telepayment server T and stored in the latter's memory M, so that the vendor can tell that the message $4_1$ was really sent by the server T. This prevents a purchaser causing a vendor to believe that he has paid the amount MT when this is not the case.

The voice message $4_2$ contains the secret code C'2 supplied by the purchaser when he first enters into the agreement with the telepayment server T and stored in the latter's memory M, so that the purchaser can tell that the message $4_2$ was really sent by the server T.

What is more, the telepayment server T can send the purchaser a supplementary confirmation message $4_3$ which is a voice message such as "You have paid the amount MT to the vendor I1".

2. Variant in Which the Purchaser Uses a Second Generation (Phase 2+) Mobile Telephone E2

This kind of mobile telephone has, in addition to the standard functions of a first generation telephone, a program execution function known as the "SIM application toolkit" stored in the SIM card. These programs can be activated by a particular menu on the screen of the mobile telephone. In addition to the internal processing (calculation, data management) that any program can perform, they enable action on the display of the mobile telephone, capture of keypad keys operated by the user, and sending and receiving SMS messages.

In this case, the telepayment process is as follows:

The purchaser activates the "Telepayment" menu stored in the SIM card of his mobile telephone E2. The menu comprises two fields: the vendor's mobile telephone number N1 and the amount MT to be paid.

During a next step a), the purchaser fills in these two numeric fields and sends the telepayment server T the SMS information message 1.

During a next step b), the telepayment server T, after receiving the message 1, extracts from its memory M the vendor's identifier I1 associated with the mobile telephone number N1 and sends the purchaser an SMS message 2 which is displayed on the screen of the purchaser's mobile telephone E2, such as "To pay the amount MT to the vendor I1, enter your payment code".

As in the first variant of the method described above, reception of the message 2 has the advantage that, from the very start of the process, the purchaser can tell if he made a mistake when he entered the vendor's mobile telephone number.

During a step c), the purchaser enters his secret payment code C2 and sends the telepayment server T an information message 3 which is none other than the message 2 duly completed by the purchaser.

After authenticating the purchaser by means of his payment code C2, the telepayment server T checks the purchaser's bank account. This check is effected in the manner envisaged for the first variant of the method according to the invention.

Finally, during a step d), the telepayment server T:
sends the vendor an SMS message $4_1$ such as "You have received the amount MT from the purchaser I2", and
sends the purchaser an SMS message $4_2$ such as "Thanks, bye for now", which indicates to the purchaser that the amount MT has been paid.

As in the first variant of the method described above, the SMS message $4_1$ also contains the vendor's secret code C1.

What is more, the telepayment server T can send a supplementary SMS confirmation message $4_3$ such as "You have paid the amount MT to the vendor I1".

The second variant of the method just described guarantees the integrity and the confidentiality of the content of the various SMS messages sent by the "SIM application toolkit" program. The techniques assuring the confidentiality and the integrity of the messages are entirely conventional and are based on encryption and the Message Authentication Code (MAC).

The number of SMS messages exchanged during this variant of the method can be reduced in the following manner.

The "Telepayment" menu stored in the SIM card of the purchaser's mobile telephone E2 includes, in addition to the above two fields—the vendor's mobile telephone number N1 and the amount MT to be paid—a key K1 that the vendor has previously communicated to the purchaser. This key K1, which consists of two digits, for example, is obtained by a mathematical algorithm $\underline{f}$ from the number N1, such that K1=f(N1). Accordingly, before the purchaser sends in step a) the SMS information message 1 containing the vendor's mobile telephone number N1 and the amount MT to be paid, the purchaser activates the "SIM application toolkit" program of his mobile telephone E2 to verify that K1=f(N1). If the result of the test is positive, the purchaser sends the message 1.

Consequently, during a step c), the purchaser has only to verify the vendor's identifier I1. This avoids the need to repeat steps a) and b) of the telepayment method in the event of an error on the identifier I1, which is a benefit given that sending SMS messages is relatively costly.

3. Variant in Which the Purchaser Uses a Third Generation WAP (Wireless Application Protocol) Mobile Telephone E2

This kind of mobile telephone has, in addition to the standard functions of a first generation telephone and the program execution function of a second generation mobile telephone, a mobile telephone-server transaction function, in the client-server sense, the server being of the http type and comparable to a standard web server. The mobile telephone can send and receive messages in the form of requests, and which can contain text, pictures or a form with rules for filling it in, such as, for example, field 1: eight-digit number, field 2: enter choice by clicking on "yes" or "no" to confirm or reject a transaction, respectively.

In this case, the telepayment process is as follows:

The purchaser clicks on an Internet address allocated to the telepayment server T, for example "telepayment.com", this address being stored beforehand in his mobile telephone E2. Merely clicking is interpreted as a request to the telepayment server T, which sends the purchaser a message consisting of a form. The form is displayed on the screen of the purchaser's mobile telephone E2 and contains, as in the second variant of the method, two fields: the vendor's mobile telephone number N1 and the amount MT to be paid.

During a next step a), the purchaser fills in the form and sends the telepayment server T the information message 1 in the form of a request which in fact consists of the above form duly completed by the purchaser.

During a next step b), the telepayment server T, after receiving the message 1, extracts from its memory M the vendor's identifier I1 associated with the mobile telephone number N1 and sends the purchaser a form message 2 that is displayed on the screen of the purchaser's mobile telephone E2, such as "To pay the amount MT to the vendor I1, enter your payment code".

As in the first and second variants of the method described above, reception of the message 2 has the advantage that, as soon as the process starts, the purchaser can tell if he made a mistake when he entered the vendor's mobile telephone number N1.

During a step c), the purchaser enters his payment code C2 and sends the telepayment server T an information message 3 of the request type that is none other than the duly completed form contained in the message 2.

After authenticating the purchaser by means of his payment code C2, the telepayment server T checks the purchaser's bank account. This check is carried out in the manner envisaged in the first and second variants of the method according to the invention.

Finally, during a step d), the telepayment server T:
sends the vendor a message $4_1$ such as "You have received the amount MT from the purchaser I2", this message being a voice message if the vendor is using a first generation mobile telephone E1 or an SMS message if the vendor is using a second or third generation mobile telephone E1, and sends the purchaser an SMS message $4_2$ such as "Thanks, bye for now" which indicates to the purchaser that the amount MT has been paid.

As in the first and second variants of the method described above, the SMS message $4_1$ also contains the vendor's secret code C'1.

What is more, the telepayment server T can send a supplementary SMS confirmation message $4_3$ such as "You have paid the amount MT to the vendor I1".

The third variant of the method just described also guarantees the integrity and the confidentiality of the content of the various messages exchanged. The messages that are sent by the purchaser to the telepayment server T are first sent via the mobile telephone network to a WAP gateway, the transmission of these messages being protected by the standard Wireless Transport Layer Security (WTLS) specification. The WAP gateway transcodes the data contained in the messages and forwards it to the telepayment server T via the Internet. The transmission of these messages is protected by the standard Secure Sockets Layer (SSL V2 or SSL V3) technique. These security techniques are also used when, reciprocally, the telepayment server T sends a message to the purchaser or to the vendor, first via the Internet and then via the mobile telephone network.

The telepayment method and system just described are intended to be applied in electronic commerce in particular, such as remote auctions, for example, or more generally in instantaneous payment services between two individuals each having a mobile telephone.

The invention claimed is:

1. A telepayment method involving a first entity comprising a vendor having an identifier, a second entity comprising a purchaser having a global system for mobile communications (GSM) type mobile equipment, and a third entity comprising a telepayment server with which the purchaser and the vendor have entered into an agreement and which is able to set up a connection at least with said mobile equipment, the method comprising:
   a) executing a preliminary exchange between the vendor and the purchaser for completing a transaction corresponding to the payment of an amount due to the vendor for a service;
   b) during the preliminary exchange, receiving, by the purchaser, the identifier of the vendor and non-confidential information including data relating to the vendor;
   c) sending by the mobile equipment of the purchaser to the telepayment server a message including the non-confidential information and said amount for the service;
   d) sending, by the server to the mobile equipment of the purchaser a message requesting the purchaser to enter a payment code, said message including at least said amount and the identifier of the vendor, said identifier being obtained by the server from the received non-confidential information;
   e) comparing, by the purchaser, the identifier received in step d) with the identifier of the vendor received during the preliminary exchange;
   f) sending, by the mobile equipment of the purchaser to the server, confidential information enabling payment of said amount, if the result of the comparison in step e) is positive; and
   g) receiving said amount by the server after the confidential information enabling payment of said amount is sent to the server.

2. The method according to claim 1, wherein the non-confidential information and the identifier are supplied to the telepayment server when the agreement is first entered into.

3. The method according to claim 1, wherein the information sent to the server in step c) and in step f) is in the form of a numerical message.

4. The method according to claim 3, wherein the vendor further comprises a mobile telephone and the non-confidential data of the numerical message sent in step c) is the vendor's mobile telephone number.

5. The method according to claim 4, wherein the purchaser's mobile equipment is of the same mobile phone standard as the vendor's mobile telephone.

6. The method according to claim 4, wherein the purchaser's mobile equipment is of a different mobile phone standard than the vendor's mobile telephone.

7. The method according to claim 3, wherein the numerical message sent in step e) is a secret payment code supplied by the purchaser to the server when the agreement is first entered into.

8. The method according to claim 1, wherein step f) is followed by a step g) during which the telepayment server verifies the information received and, if the result of said verification is positive, sends to the mobile equipment of the purchaser and to equipment of the vendor respective confirmation messages that said amount has been paid.

9. The method according to claim 8, wherein, on receiving the respective confirmation message, the vendor authenticates the telepayment server by means of a secret code supplied by the vendor to the telepayment server when the agreement is first entered into.

10. The method according to claim 1, wherein step a) is preceded by:
    calculating a first value by the mobile equipment of the purchaser, by application of a mathematical algorithm (f) to the data relating to the vendor; and
    comparing the calculated first value with a second value sent by the vendor during the preliminary exchange.

11. A telepayment system comprising, mobile equipment of the GSM type used by a purchaser: and
  a telepayment server with which the purchaser and a vendor have entered into an agreement and which is able to set up a connection at least with said mobile equipment, a preliminary exchange having been established between the vendor and the purchaser for completing a transaction corresponding to the payment of an amount due to the vendor for a service;
wherein the mobile equipment comprises:
  means for receiving an identifier of the vendor and non-confidential information comprising data relating to the vendor;
  means for sending to the telepayment server either the non-confidential information and said amount for the service, or confidential information; and
  means for receiving from the telepayment server a message requesting the purchaser to enter a payment code; and
wherein the telepayment server comprises:
  means for authenticating the vendor's identifier on the basis of the non-confidential information received from the mobile equipment of the purchaser; and
  means for sending in response to the mobile equipment of the purchaser a message requesting the purchaser to enter a payment code, said message including at least said amount and the vendor's identifier; and
  means for receiving said amount by the server after the payment code has been entered.

* * * * *